(12) United States Patent
Nguyen

(10) Patent No.: US 7,455,591 B2
(45) Date of Patent: Nov. 25, 2008

(54) REDUNDANT GAMING NETWORK MEDIATION

(75) Inventor: Binh T. Nguyen, Reno, NV (US)

(73) Assignee: IGT, Reno, NV (US)

(*) Notice: Subject to any disclaimer, the term of this patent is extended or adjusted under 35 U.S.C. 154(b) by 882 days.

(21) Appl. No.: 10/187,059

(22) Filed: Jun. 28, 2002

(65) Prior Publication Data

US 2004/0002385 A1 Jan. 1, 2004

(51) Int. Cl.
*A63F 13/12* (2006.01)

(52) U.S. Cl. .............................. 463/42; 463/25; 463/29; 463/39; 463/40; 463/41; 463/43

(58) Field of Classification Search ............. 463/39–43, 463/25, 29; 340/5.1–5.92; 380/251; 705/18
See application file for complete search history.

(56) References Cited

U.S. PATENT DOCUMENTS 4,335,809 A * 6/1982 Wain ............................ 463/20
5,046,066 A * 9/1991 Messenger ................... 370/349

(Continued)

FOREIGN PATENT DOCUMENTS

EP 0744786 11/1996

(Continued)

OTHER PUBLICATIONS

"Guards: A Generic Upgradable Architecture for Real-Time Dependable System," by Powell, et al., IEEE Transactions on Parallel and Distributed Systems, vol. 10, No. 6, Jun. 1999.*

"A Dynamic Channel Assignment Scheme with Two Thresholds for Load Balancing in Cellular Networks," by Kim, et al., 1999, IEEE.*

(Continued)

*Primary Examiner*—Robert E Pezzuto
*Assistant Examiner*—Matthew D. Hoel
(74) *Attorney, Agent, or Firm*—Weaver Austin Villeneuve & Sampson LLP

(57) ABSTRACT

A disclosed gaming communication network provides an enhanced DCU that provides redundant mediation between gaming machines on the gaming communication network and a host server. The enhanced DCU provides a first, primary transmission path and a second, redundant transmission path between the gaming machines and the host server. In the event one transmission path is disrupted, the other provides continuing transmissions between the gaming communication network and the host server. In the event both transmission paths are disrupted, the enhanced DCU functions as a local interim server and stores data received from the gaming machines on the gaming communication network until such time as the data can be transmitted to the host server. In some embodiments, the enhanced DCU acts as a local interim server to the gaming machines using data mirrored from the host server prior to transmission disruption. In some embodiments, the enhanced DCU functions as a download server and stores data received from the host server and asynchronously transmits the data to the gaming machines, so as to mitigate disruption of game play. In some embodiments, the enhanced DCU may also function as a local cache of information that is repeatedly accessed by the gaming machines on the gaming communication network so as to reduce the transmission load on the first and/or second transmission path. In some embodiments, the enhanced DCU provides different network input connection ports to enable utilization of the enhanced DCU with different network formats, such as fiber optic cable, twisted pair cable, or wireless transmission media.

70 Claims, 6 Drawing Sheets

U.S. PATENT DOCUMENTS

| | | | |
|---|---|---|---|
| 5,116,055 A * | 5/1992 | Tracy | 463/27 |
| 5,655,961 A * | 8/1997 | Acres et al. | 463/27 |
| 5,761,647 A | 6/1998 | Boushy | 705/10 |
| 5,762,552 A | 6/1998 | Vuong et al. | |
| 5,902,983 A * | 5/1999 | Crevelt et al. | 235/380 |
| 6,135,887 A | 10/2000 | Pease et al. | |
| 6,162,122 A | 12/2000 | Acres et al. | 463/29 |
| 6,264,561 B1 | 7/2001 | Saffari et al. | |
| 6,347,738 B1 | 2/2002 | Crevelt et al. | 235/380 |
| 6,368,216 B1 | 4/2002 | Hedrick et al. | 463/20 |
| 6,379,247 B1 | 4/2002 | Walker et al. | 463/25 |
| 6,488,580 B1 | 12/2002 | Robb | 463/23 |
| 6,638,170 B1 | 10/2003 | Crumby | 463/42 |
| 6,645,077 B2 | 11/2003 | Rowe | |
| 6,665,812 B1 * | 12/2003 | Blumenau et al. | 714/5 |
| 2002/0045477 A1 | 4/2002 | Dabrowski | 463/29 |
| 2002/0049909 A1 | 4/2002 | Jackson et al. | 713/188 |
| 2002/0071557 A1 | 6/2002 | Nguyen | 380/251 |
| 2003/0018927 A1 * | 1/2003 | Gadir et al. | 714/4 |
| 2003/0182428 A1 * | 9/2003 | Li et al. | 709/227 |

FOREIGN PATENT DOCUMENTS

| | | |
|---|---|---|
| EP | 0 744 786 B1 * | 12/1998 |
| EP | 0744786 | 12/1998 |
| GB | 2 151 054 | 10/1985 |
| WO | WO01/99067 | 12/2001 |
| WO | WO01/99067 A | 12/2001 |
| WO | WO03/019486 | 3/2003 |
| WO | 2004/095383 | 11/2004 |
| WO | 2004/095383 X | 11/2004 |

OTHER PUBLICATIONS

"Investigations into Integrated Location Management in Mobile Multimedia Networks," by Pomekanti, et al., 2000, IEEE.*

"Supporting Server-Level Fault Tolerance in Concurrent-Push-Based Parallel Video Servers," by Lee, IEEE Transactions on Circuits and Systems for Video Technology, vol. 11, No. 1, Jan. 2001.*

"Bluetooth: Technology for Short-Range Wireless Apps," by Bhagwat, May/Jun. 2001, IEEE Internet Computing.*

"Wi-Fi (802.11b) and Bluetooth: Enabling Coexistence," by Lansford, et al., IEEE Network, Sep./Oct. 2001.*

Mikohn 1992 product catalog (p. 4-3 discusses different game types on the same network).*

2000 GAMMA standard.*

*Gaming System Overview*, 1.1 Overview, GS 300 Player Tracking Hardware-Installation and Troubleshooting, Apr. 15, 1999, pp. 1-7.

*Data Collection Unit (DCU)* 2.2.1 Smart 2 Systems Hardware, General Description and Installation, Feb. 7, 1997, pp. 2-17-2-22.

PCT International Search Report, 4 page document entitled, "Redundant Gaming Network Mediation" International Publication No. WO 004/004285, PCT/US2003/018356.

PCT International Preliminary Examination Report, 3 page document, Applicant's file reference No. IGT1P056.WO.

European Office Action dated Oct. 28, 2005 from a corresponding EP Application No. 03741918.1 (6 pages).

IGS: System Controls User's Guide, Apr. 15, 1999, Introduction in IGT System Reference Manual, pp. 1-25.

PCT International Search Report and Written Opinion dated Sep. 14, 2006 from corresponding PCT application No. PCT/US2006/021853.

European Office Action dated Nov. 10, 2006 from corresponding EP application No. 03741918.1-1525.

Austrian Office Action dated Aug. 10, 2007 from corresponding AU application No. 2003280483.

PCT International Search Report and Written Opinion dated Sep. 14, 2006 from corresponding PCT application No. PCT/US2006/021853.

European Office Action dated Nov. 10, 2006 from corresponding EP application No. 03741918.1-1525.

Australian Office Action dated Aug. 10, 2007 from corresponding AU application No. 2003280483.

* cited by examiner

REDUNDANT GAMING NETWORK MEDIATION

FIELD OF THE INVENTION

The present invention relates to gaming machines, such as slot machines and video poker machines. More particularly, the present invention relates to data collection units that serve as intermediaries between local gaming communication networks, and the individual gaming machines connected thereto, and one or more host servers which may or may not be local.

BACKGROUND OF THE INVENTION

There are a wide variety of associated devices that can be connected to a gaming machine, such as a slot machine or a video poker machine. Some examples of these devices are lights, ticket printers, card readers, speakers, bill validators, ticket readers, coin acceptors, display panels, key pads, coin hoppers, and button pads. Many of these devices are built into the gaming machine or components associated with the gaming machine, such as a top box which usually sits on top of the gaming machine.

Typically, utilizing a master gaming controller, the gaming machine controls various combinations of devices that allow a player to play a game on the gaming machine and also encourage game play on the gaming machine. For example, a game played on a gaming machine usually requires a player to input money or an indicia of credit into the gaming machine, indicate a wager amount, and initiate game play. These steps require the gaming machine to control input devices, such as bill validators and coin acceptors, to accept money into the gaming machine and recognize user inputs from devices, including key pads, button pads, card readers, and ticket readers, to determine the wager amount, and initiate game play. After game play has been initiated, the gaming machine determines a game outcome, presents the game outcome to the player and may dispense an award of some type depending on the outcome of the game. The operations described above may be carried out on the gaming machine when the gaming machine is operating as a "stand alone" unit or linked in a network of some type to a group of gaming machines.

As technology in the gaming industry progresses, more and more gaming services are being provided to gaming machines via communication networks that link groups of gaming machines to a remote computer, such as a host server, that provides one or more gaming services. As an example, gaming services that may be provided by a remote computer to a gaming machine via a communication network of some type include player tracking, accounting, cashless award ticketing, lottery, progressive games, and bonus games.

Typically, network gaming services enhance the game playing capabilities of the gaming machine or provide some operational advantage in regard to maintaining the gaming machine, such as better accounting management or player tracking. Accordingly, network gaming services provided to groups of gaming machines linked over a dedicated communication network of some type have become very popular in the gaming industry.

In general, the dedicated communication network is not accessible to the public. Due to the sensitive nature of much of the information on the dedicated networks, for example, electronic fund transfers and player tracking data, usually the manufacturer of a host system, such as a player tracking system, or group of host systems, employs a particular networking language having proprietary protocols. For instance, 10-20 different companies produce player tracking host systems where each host system may use different protocols. These proprietary protocols are usually considered highly confidential and not released publicly. Thus, whenever a new host system is introduced for use with a gaming machine, rather than trying to interpret all the different protocols utilized by different manufacturers, the new host system is typically designed as a separate network. Consequently, as more host systems are introduced, the independent network structures continue to build up in the casino.

Further, in the gaming industry, gaming machines are generated by many different manufacturers. The communication protocols on the gaming machine are typically hard-wired into the gaming machine and each gaming machine manufacturer may utilize a different proprietary communication protocol. A gaming machine manufacturer may also produce host systems in which case their gaming machine are compatible with their own host systems. However, in a heterogeneous gaming environment, such as a casino, gaming machines from many different manufacturers each with their own communication protocol may be connected to host systems from many different manufacturers each with their own communication protocol. Therefore, communication compatibility issues regarding the protocols used by the gaming machines in the system and protocols used by the host systems must be considered.

To justify the costs associated with the infrastructure needed to provide network gaming services on a dedicated communication network, a certain critical number of gaming machines linked in a network of some type must utilize the service. Thus, many of the networked gaming services are only provided at larger gaming establishments where a large number of gaming machines are deployed.

A progressive game network offering progressive game services is one example where a group of gaming machines are linked together using a dedicated network to provide enhanced game playing service. The progressive game services enabled by the progressive game network increase the game playing capabilities of a particular gaming machine by enabling a larger jackpot than would be possible if the gaming machine was operating in a stand alone mode. The potential size of the jackpot increases as the number of gaming machines connected in the progressive network is increased. The size of the jackpot tends to increase game play on gaming machines offering a progressive jackpot which justifies the costs associated with installing and maintaining the dedicated progressive gaming network.

As earlier discussed, a particular gaming entity may also desire to provide network gaming services which provide some operational advantage. Thus, other dedicated networks may also connect the gaming machines to host servers which track the performance of gaming machines under the control of the entity, such as for accounting management, electronic fund transfers (EFTs), cashless ticketing, such as EZPay™, marketing management, and data tracking, such as player tracking.

FIG. 1 illustrates a block diagram depicting gaming machines within a dedicated communication network connected to a host server via a typical data collection unit (DCU) in the prior art. In FIG. 1, gaming machine 102, and the other gaming machines 130, 132, 134, and 136, typically include a main cabinet 106 and a top box 104. The main cabinet 106 usually houses the main gaming elements and can also house peripheral systems, such as those that utilize dedicated gaming networks. The top box 104 may also be used to house these peripheral systems.

As earlier described, the master gaming controller 108 typically controls the game play on the gaming machine 102 and receives or sends data to various input/output devices 111 on the gaming machine 102. The master gaming controller 108 may also communicate with a display 110, electronic funds transfer system 112, bonus system 114, EZPay™ system 116, such as cashless ticketing system, and player tracking system 120. The systems of the gaming machine 102 typically communicate the data onto the network 122 via a communication board 118.

In the past, the amount of data transmitted over gaming networks in a casino environment has not been large. For instance, metering information, such as the amount of money input into the gaming machine and the amount of money output from the gaming machine, requires only a small amount of network bandwidth to transmit. Large data transfers, such as transmitting large files between gaming devices, have not been performed in a casino environment. Large file transfers have not been implemented because of regulatory and security requirements unique to the gaming industry.

In the present illustration, the gaming machines, 102, 130, 132, 134, and 136 are connected to a dedicated gaming network 122. In general, the DCU 124 functions as an intermediary between the different gaming machines on the network 122 and the host server 128. In general, the DCU 124 receives data transmitted from the gaming machines and sends the data to the host server 128 over a transmission path 126. In some instances, when the hardware interface used by the gaming machine is not compatible with the host server 128, a translator 125 may be used to convert serial data from the DCU 124 to a format accepted by the host server 128. The translator may provide this conversion service to a plurality of DCU's, such as 124, 140 and 141. The DCU's in the network don't communicate with each other.

Further, in some dedicated gaming networks, the DCU 124 can receive data transmitted from the host server 128 for communication to the gaming machines on the gaming network. The received data are typically communicated synchronously to the gaming machines on the gaming network. Within a casino, the gaming machines 102, 130, 132, 134 and 136 are typically located on the gaming floor for player access while the host server 128 is usually located in the backroom of the casino or at another location. Thus, transmission path 126 is usually the sole transmission path between the DCU 124 and the host server 128. Should the transmission path 126 be disrupted or severed, data sent from the gaming machines is either lost, or, in some cases, may need to be individually collected from each of the gaming machines on the gaming network and then separately provided to the host server 128.

In a gaming network, gaming machines, such as 102, 130, 132, 134 and 136, may be connected through multiple communication paths to a number of gaming devices that provide gaming services. For example, gaming machine 102 is connected to four communication paths, 122, 148, 149 and 150. As described above, communication path 122, allows the gaming machine 102 to send information to host server 128. Via communication path 148, the gaming machine 102 is connected to a clerk validation terminal 142. The clerk validation terminal 142 is connected to a translator 143 and a cashless system server 144 that are used to provide cashless gaming services to the gaming machine 102. Gaming machine 130, 132, 134 and 136 are also connected to the clerk validation terminal 142 and may receive cashless system services.

Via communication path 149, the gaming machine 102 is connected to a wide area progressive (WAP) device 146. The WAP is connected to a progressive system server 147 that may be used to provide progressive gaming services to the gaming machines. Although not shown, the other gaming machines may also be connected to the WAP device 146. Via communication path 150, the gaming machine 102 may be connected with additional gaming devices (not shown) that provide other gaming services.

The gaming devices located on the different communication paths, such as the four communication paths, 122, 148, 149 and 150 don't communicate with one another because each communication path is located on a separate and independent network. For instance, the WAP 146 on communication path 149 doesn't communicate with the CVT 142 on communication path 142. As another example, cashless system server 144 does not communicate with the progressive system server 147 or the host server 128.

As described above, each gaming machine (i.e., 102, 130, 132 and 134) may be connected through multiple communications paths on separate and independent networks to a number of gaming devices executing a gaming application. With this network topology, the total number of communication paths is proportional to the number of gaming applications with an independent network. For a large number of gaming machines and gaming applications in the network, the large total number of communication paths increases the costs of maintaining the network, makes reconfiguring the network difficult and time consuming and makes expanding the network costly (e.g., adding more gaming devices).

FIG. 2 illustrates a block diagram depicting one example of the DCU 124 shown in FIG. 1 in the prior art. Generally, the DCU 124 functions to accept a single network connection 202 from each of a plurality of gaming machines (16 gaming machines are shown in the figure). On the gaming machine side, the DCU 124 is not connected to any other gaming devices other than the gaming machines. The DCU 124 polls for data from each of the gaming machines and converts the data signals to an electronic signal data format signal accepted by the host server 128 (e.g., 5 volts to 28 volts). Then, the DCU 124 outputs the formatted electronic data signal to the host server 128. The DCU 124 may also receive a formatted data signal from the host server 128, convert the formatted data signal to an electronic signal format used by the gaming machines and send the reformatted signal to the gaming machines. Electronic signal conversion such as from a signal format used by the gaming machines (e.g., fiber optic, RS-232, RS-485) to a signal format used by the host is provided by the electronic signal conversion element 206. For instance, a fiber optic data signal used by the gaming machines may be converted to an RS-232 signal format used by the host server.

The DCU 124 may communicate with the gaming machines using a communication connection, such as an RS232 communication connection, an RS485 communication connection or fiber optic communication connection. The DCU 124 performs the communications using a multi-drop system 204. In the multi-drop system, all messages are broadcast to all of the gaming machines connected to the DCU 124. For instance, when DCU 124 polls an individual gaming machine for information, all of the gaming machines receive the message requesting polling information (i.e., the message is broadcast to all the machines on the network). However, only the gaming machine identified in the request responds to the message. As another example, when a message is sent to an individual gaming machine from a host server, all of the gaming machines receive the message but only the addressed gaming machine will process the message.

Typically, the DCU 124 may be connected to a maximum of 32 gaming machines. Thus, the DCU 124 is an important node in the gaming network. Any difficulties within the DCU 124 or within the network between the DCU 124 and the host server may result in a disruption of services for a large number of gaming machines.

In view of the above, it would be desirable to have a device and/or method which provides communication redundancy and network mediation between gaming machines and associated servers on a gaming communication network to mitigate the loss of data during a disruption in the transmission path between the DCU and the host servers, which simplifies the gaming communication network topology and which increases the capabilities of the gaming communication network. It is also desirable to provide methods and apparatus that can mediate disparate communication protocols in a heterogeneous network environment of mixed gaming application and gaming devices from various suppliers.

SUMMARY OF THE INVENTION

The present invention provides an enhanced DCU that provides redundant gaming network communication and protocol mediation services between gaming machines and associated servers on a gaming communication network.

One aspect of the invention provides an enhanced DCU that provides at least one redundant transmission path to the host server. The apparatus may be generally characterized as including: a first, primary transmission path between the gaming machines on the gaming communication network and a host server; and at least a second, redundant transmission path between the gaming machines on the gaming communication network and the host server.

Another aspect of the present invention provides a gaming communication network having redundant network communication between a plurality of gaming machines and a host server. The gaming communication network may be generally characterized as including: an enhanced DCU for providing redundant network communication between a plurality of gaming machines and the host server over a network; a plurality of gaming machines, the plurality of gaming machines in communication with an enhanced DCU; a host server, the host server in communication with the enhanced DCU; and a network, the network allowing communication between the host server and the plurality of gaming machines via the enhanced DCU.

Another aspect of the present invention provides an apparatus for providing redundant network mediation between gaming machines and a host server on a gaming communication network. The apparatus may be generally characterized as including: means for receiving data from gaming machines on a gaming communication network over at least one network connection; means for converting the data into a designated file format suitable for acceptance by a host server on the gaming communication network; means for transmitting the formatted data over a first, primary transmission path to the host server; and means for transmitting the formatted data over a second, redundant transmission path.

Another aspect of the present invention provides, in an enhanced DCU, a method for providing network mediation on a gaming communication network with a plurality of gaming machines, one or more host servers and a plurality of transmission paths between the gaming machines and the one or more host servers, including: monitoring communications between a plurality of gaming machines and one or more host servers; mirroring gaming information stored on the one or more host servers on the enhanced DCU; detecting a first, primary transmission path has been lost between the gaming machines and the one or more host servers; and switching communications to a second transmission path.

In some embodiments, the method may further include: detecting the second transmission path has been lost, and then receiving a gaming information request directed to a first host server from a first gaming machine; and sending a reply message with the requested gaming information to the first gaming machine using mirrored gaming information from the first host server stored on the enhanced DCU. In some embodiments, the method may include: receiving a message with gaming information directed to a first host server from a first gaming machine; and storing the gaming information to a memory device. Upon detecting a transmission path between the enhanced DCU and the first host server is available, the stored gaming information may then be transmitted to the first host server.

These and other features of the present invention will be presented in more detail in the following detailed description of the invention and the associated figures.

DESCRIPTION OF THE PREFERRED EMBODIMENTS

The present invention provides for an enhanced data collection unit (DCU) that provides redundant communication and network mediation between a plurality of gaming machines connected on a gaming communication network and a host server.

Figure 3:
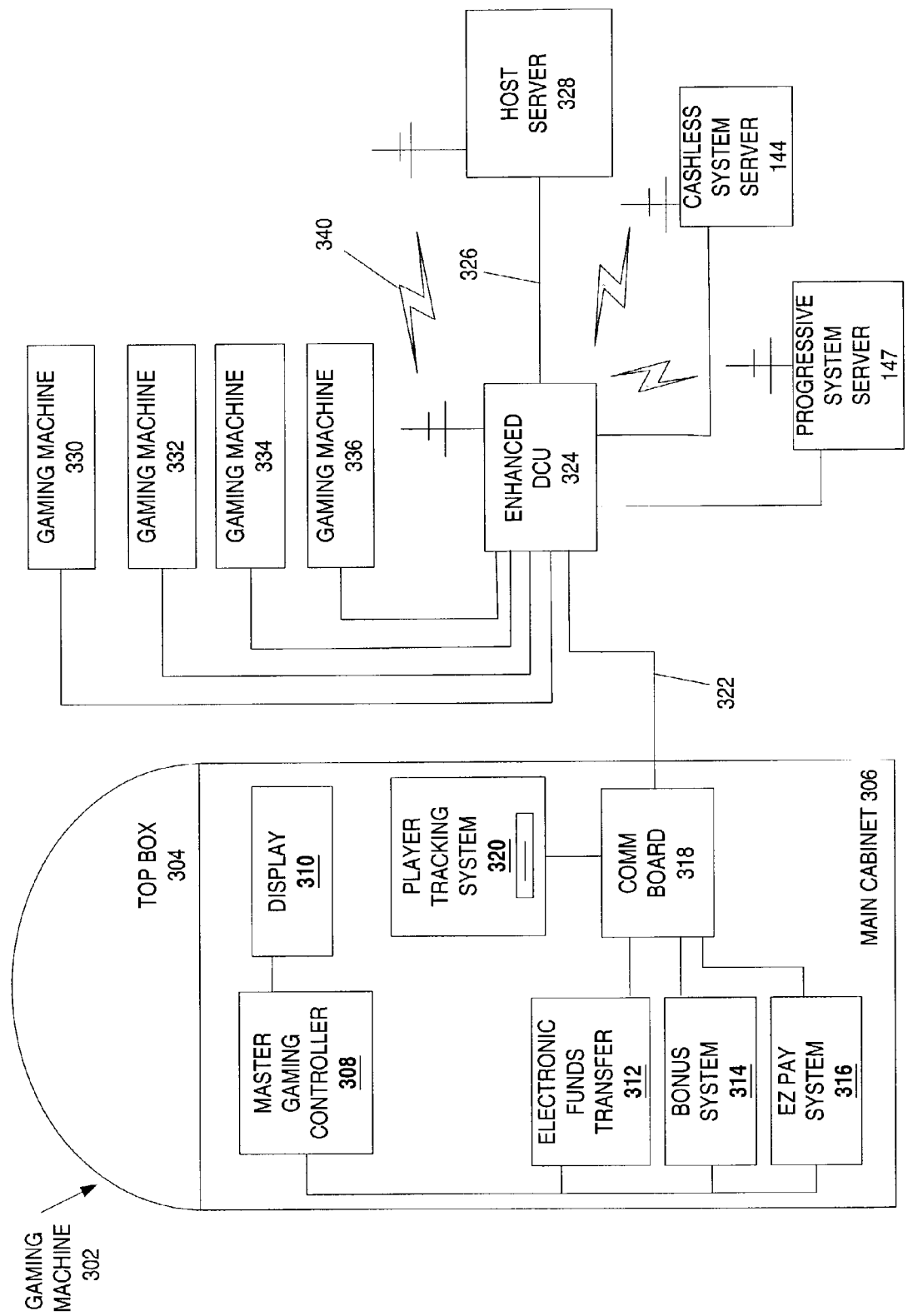
FIG. 3 illustrates a block diagram generally depicting gaming machines within a dedicated communication gaming communication network connected to a host server via an enhanced DCU that provides redundant communication and network mediation according to one embodiment of the present invention.
Figure 4:
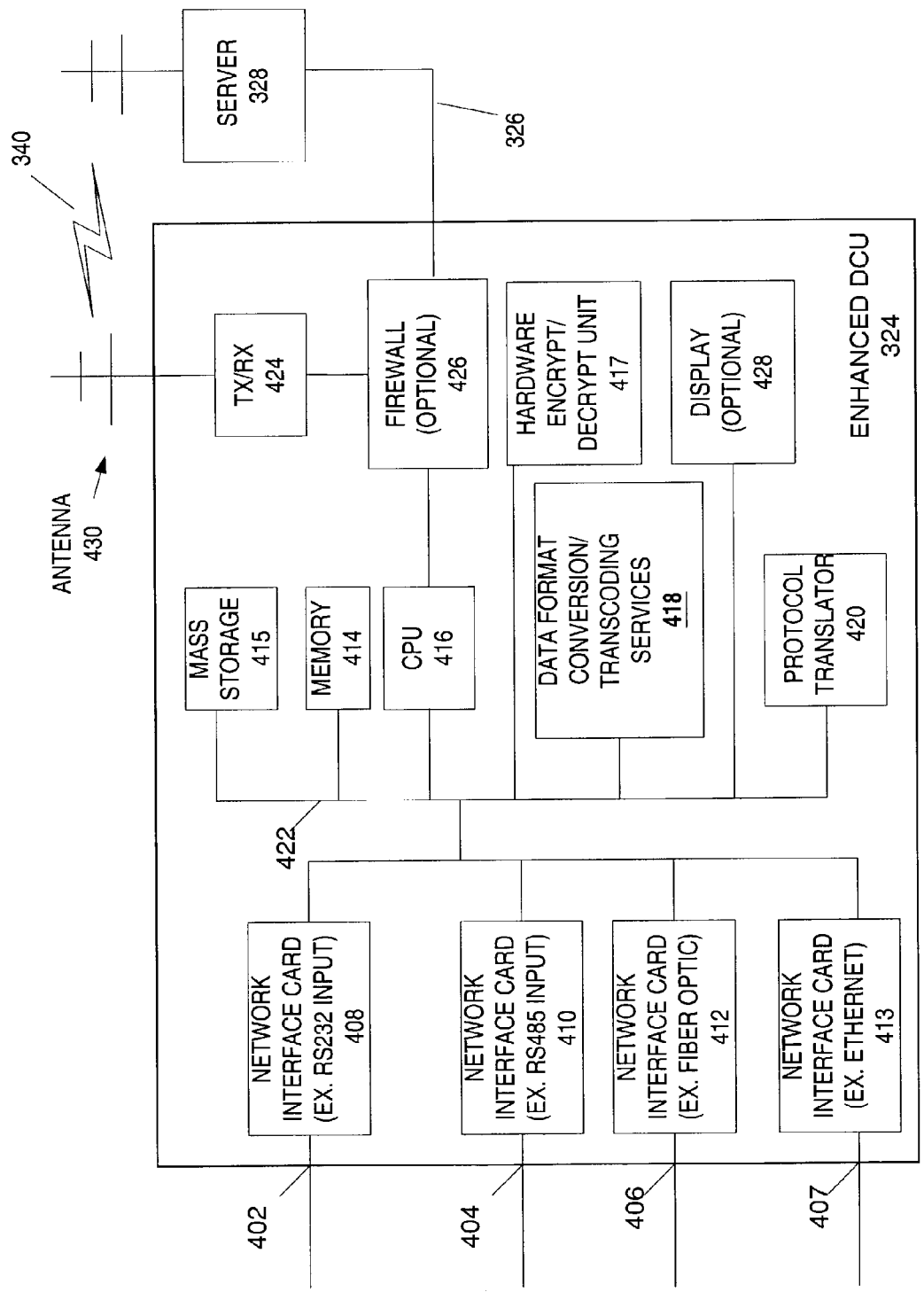
FIG. 4 illustrates a block diagram depicting the enhanced DCU shown in FIG. 3 according to one embodiment of the present invention.

FIGS. 3 and 4 illustrate several aspects of the present invention, which provide redundant gaming communication and network mediation between gaming machines on a gaming communication network and a host server. It will be appreciated that various hardware and software architectures may be used to implement the present invention and that the embodiments shown in FIGS. 3 and 4 are intended to illustrate the present invention rather than limit it. Further, any of the embodiments described herein may also provide for the further encryption and/or physical protection of the data being stored and/or transmitted. Additionally, although the present invention is described with regard to one host server, the present invention may include more than one host server.

FIG. 3 illustrates a block diagram generally depicting gaming machines within a dedicated gaming communication network connected to a host server via an enhanced DCU. In FIG. 3, the components of the gaming machine 302, and the other gaming machines 330, 332, 334 and 336 are similar to those described with regard to gaming machine 102, and the other gaming machines 130, 132, 134 and 136 in FIG. 1 and are not redescribed herein. In the present illustration, the gaming machine 302 and the other gaming machines 330, 332, 334 and 336 are connected to a dedicated gaming communication network 322. Data transmissions between the gaming machines on the gaming communication network 322 and the host server 328 are mediated by the enhanced DCU 324 of the present invention.

The enhanced DCU 324 provides for a first transmission path 326 between the gaming machines on the gaming communication network 322 and the host server 328 and a second, redundant transmission path 340 between the gaming machines on the gaming communication network 322 and the host server 328. Although not required, it is preferred that the first and second transmission paths 326, 340 be different transmission media. For example, the first transmission path 326 may act as the primary transmission path and may be a land cable, such as an RS232 cable, an RS485 cable, Ethernet Cable or a fiber optic cable. The second, redundant transmission path 340 may be a wireless transmission path, such as an RF transmission path. It will be appreciated that the reverse designation may also be utilized. Further, any of a wide variety of transmission media may be used and the above examples are merely to illustrate the present invention.

When one of the two transmission paths 326, 340 is disrupted or severed or busy, the remaining transmission path provides continuing transmission to the host server 328. Thus, for example, if the first transmission path 326 is disrupted, the second transmission path 340 may still provide continuing transmissions to the host server 328.

In one example, the enhanced DCU 324 may transmit substantially simultaneously over both the first and second transmission paths 326, 340. In another example, the enhanced DCU 324 may transmit over a primary transmission path, for example, first transmission path 326, and then activate the use of the second, redundant transmission path 340 when the first transmission path 326 is disrupted or severed.

In the event both the first and second transmission paths 326, 340 are disrupted or severed or busy, the enhanced DCU 324 may further act as a local interim server and store the data received from the gaming machines on the gaming communication network 322 until such time as a transmission path to the host server 328 is restored and the data can be transmitted.

By storing the data from the gaming machines on the gaming communication network 322, the enhanced DCU 324 permits data to be retained that might otherwise be lost in some network configurations and may alleviate the need for individual readings of gaming machines in other network configurations until restoration of transmissions to the host server 328.

In gaming communication networks in which the host server 328 communicates data to the gaming machines on the gaming communication network 322, the enhanced DCU 324 may also act as a local data cache for data downloaded to an individual gaming machine. The local data cache on the enhanced DCU 324 may allow asynchronous communication of the downloaded data to the individual gaming machine. Asynchronous communication of data via the enhanced DCU may be utilized to prevent any degradation in the gaming machine performance resulting from any activities performed during the data download process.

As an example, a remote device may send a large data download, such as but not limited to a requested game, to a gaming machine while the gaming machine is providing game play. Game play on the gaming machine may be affected when the gaming machine is engaged in the transfer of a large amount of data. Therefore, the gaming machine may block large data transfers while it is engaged in providing game play. Asynchronous communication of data by the enhanced DCU 324 mitigates disruption of game play on the gaming machines as a result of a large data download and allows the gaming machine to receive data when it is ready.

As another example, a player on gaming machine 302 playing a bonus game may request information describing the prizes that can be played for during the game. The enhanced DCU 324 could transmit this request to the host server 328. When the information is retrieved and transmitted to the enhanced DCU 324, the data are stored at the enhanced DCU 324 until the complete file of information is received. The enhanced DCU 324 would then transmit the data to gaming machine 302 when the gaming machine 302 indicates it is available for transmissions from the enhanced DCU 324. This process of storage and asynchronous transmission can be used for other gaming communication network information, such as game software updates, payment transactions, gaming services software updates, etc.

In gaming communication networks in which a set of particular data may be requested from the gaming machines, such as bonus prize descriptions, programs, and advertisements, the enhanced DCU 324 may also act as a local cache of this information for accessing over the gaming communication network 322 without having to repeatedly transmit requests for the information to the host server 328. For example, a player on gaming machine 302 may wish to access the casino show schedule for the week. This information may be cached at the enhanced DCU 324 for accessing by the gaming machine 302 without having to transmit a request to the host server 328. In this way, the enhanced DCU 324 alleviates some of the transmission load from the first and/or second transmission paths 326, 340.

Other types of data typically retained at the host server 328, may also be stored on the enhanced DCU 324, through mirroring of all or selected data sets on the host server 328, for example, game licensing data, accumulation of player tracking points, player profile information, cashless transaction authorizations, player preference information, game paytables, game software and frequently requested information (e.g., show times, directions). During disruption of transmission paths to the host server 328, the enhanced DCU 324 may act as a local interim server to the gaming machines on the network to enable game play to continue. This method is further described herein with reference to FIG. 5

In another embodiment, when network traffic is busy, the DCU 324 may act as a local interim server to prevent further network performance degradation. The busyness of a network segment refers to the amount of information passing through the segment at a particular time. A given network segment may allow for a maximum transmission rate (bandwidth). Based upon a regulation scheme used for mediating network traffic, such as the communication load or message traffic on a network segment exceeding a threshold, the DCU 324 may store data in the local interim server and then resend the information when the network segment is less congested or send the information via an alternate communication path.

In yet another embodiment, the interim server capabilities on the DCU 324 may be used to reduce network traffic on portions of the network by storing commonly requested information or applications. To simplify the gaming communication network, the number of communication paths may be reduced and the remaining communication paths may be shared between a plurality of gaming devices running a heterogeneous set of applications. Traditionally, a separate communicate path has been used for each gaming application/hardware set, i.e., player tracking/accounting applications/hardware use a first communication path, cashless systems applications/hardware use a second communication path, progressive applications/hardware use a third communication path, linked bonus game applications/hardware use a fourth communication path and so on. With the present invention, a common communication path may be used for a plurality of heterogeneous gaming applications. For instance, the same communication path may be used to transmit gaming application information related to progressive games, cashless transactions, player tracking/accounting services and linked bonus game applications.

With shared communications paths, network reliability and managing bandwidth on the gaming communication network becomes more important. This is especially true for applications, such as downloading games, that require large data transfers. For example, when the DCU 324 supports game downloads from a game server, commonly requested games may be stored on the DCU 324 to reduce network traffic between the DCU 324 and the game server. The additional bandwidth between the DCU 324 and the game server may be used by other gaming applications on the game server or other host servers/gaming devices that share this network segment.

To transfer data in a secure manner, data downloaded to the enhanced DCU 324 from a host server 328 may be encrypted. In one embodiment of the present invention, an asymmetric encryption scheme incorporating a public-private encryption key pair may be used. Information encrypted with the private encryption key may be decrypted only using the corresponding public encryption key of the public-private encryption key pair and information encrypted with the public encryption key may be decrypted only using the private encryption key of the public-private encryption key pair. Thus, an entity with a private encryption key of public-private encryption key pair may give its public encryption key to many other entities. The public key may be made available (via an Internet server, e-mail, or some other means) to whoever needs or wants it. The private key, on the other hand, is kept secret. Only the owner of the key pair is allowed to possess the private key. The other entities may use the public encryption key to encrypt data. However, as long as the private encryption key remains private, only the entity with the private encryption key can decrypt information encrypted with the public encryption key.

In general, public-key encryption algorithms are very slow and it is impractical to use them to encrypt large amounts of data. In practice, symmetric algorithms are used for encryption/decryption of large amounts of data, while the public-key algorithms are used merely to encrypt the symmetric keys. Similarly, it is not usually practical to use public-key signature algorithms to sign large messages. Instead, a hash may be made of the message and the hash value may be signed. Methods of asymmetric and symmetric keys that may be used to transfer encrypted data in the present invention are described co-pending U.S. application Ser. No. 10/116,424, filed Apr. 3, 2002, by Nguyen et al. and entitled, "Secured Virtual Network in a Gaming Environment," which is incorporated herein in its entirety and for all purposes.

A private key of a public-private signature key pair may also be used to sign a message. The signature may be used for authenticating the message. When the private signature key is used to sign a message, then the public signature key must be used to validate the signature. The Digital Signature Standard (DSS) authorized by the U.S. government uses a private signature key, a public encryption key and a secure hash algorithm for generating and authenticating electronic signatures. For example, to send someone a digitally signed message, the message is signed with a private signature key, and the receiver of the message may verify the signature by using the public signature key corresponding to the private signature key. Prior to beginning a secure data transfer, the enhanced DCU 324 and the host server may have exchanged public encryption keys or public signature keys and other security information that may be used to establish the identity of the sender of a message to the enhanced DCU 324 and to identify messages sent from the enhanced DCU 324. Details of exchanging encryption keys in a secure manner which may be applied to the present invention are described in co-pending U.S. application Ser. No. 09/993,163, by Rowe et al., filed Nov. 16, 2001 and entitled "A Cashless Transaction Clearinghouse," which are incorporated herein by reference in its entirety and for all purposes.

The enhanced DCU 324 may perform secure transactions with many different devices. As an example, a secure exchange between the enhanced DCU 324 and the host server 328 is described. To initiate a data transfer, the host server 328 and the enhanced DCU 324 may exchange messages that are encrypted with the public-private key pairs by used each other. This process may be initiated to authenticate the identities the devices involved in the data transfer.

For instance, the host server may send a message to the enhance DCU 324 that is encrypted with the DCU's public encryption key. The DCU 324 may decrypt the message with its private encryption key and then send a reply encrypted with the host server's 328 public encryption key. The host server 328 may decrypt the message with its private key. Since only the DCU 324 and the host server 328 have access to their private keys, the identities of the DCU 324 and the host server 328 are established.

Next, the enhanced DCU 328 may receive a message from the host server 324 with data encrypted using a symmetric encryption key and a symmetric encryption key encrypted using the enhanced DCU's public encryption key. The enhanced DCU may decrypt the symmetric encryption key using its private key and then decrypt the data encrypted with the symmetric key using the symmetric encryption key. The decrypted data may include a target destination such as information identifying a gaming machine. Using the target destination information, the enhanced DCU 328 may forward the information to the gaming machine.

The process may also be implemented in reverse. For instance, the enhanced DCU 328 may receive unencrypted data from a gaming machine for a target device such as the host server 328. The DCU 328 may generate a symmetric encryption key and encrypt the data from the gaming machine with the symmetric encryption key. Then, the DCU 328 may encrypt the symmetric encryption key with a public encryption key used by the target device and send a message with the encrypted symmetric encryption key and the data encrypted with the symmetric encryption key to the target device.

Figure 1:
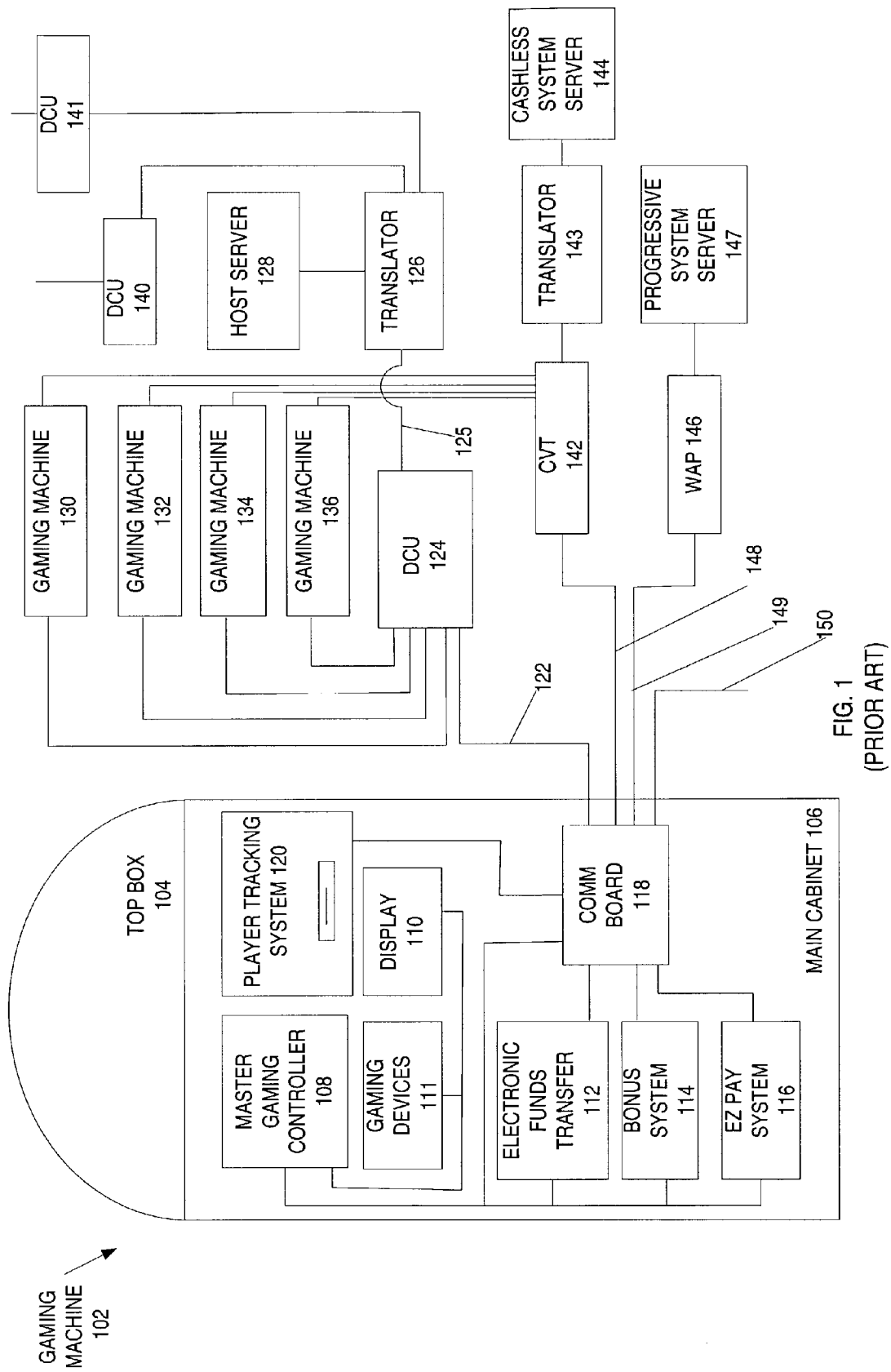
FIG. 1 illustrates a block diagram depicting gaming machines within a dedicated communication network connected to a host server via a typical data collection unit (DCU) in the prior art.
Figure 2:
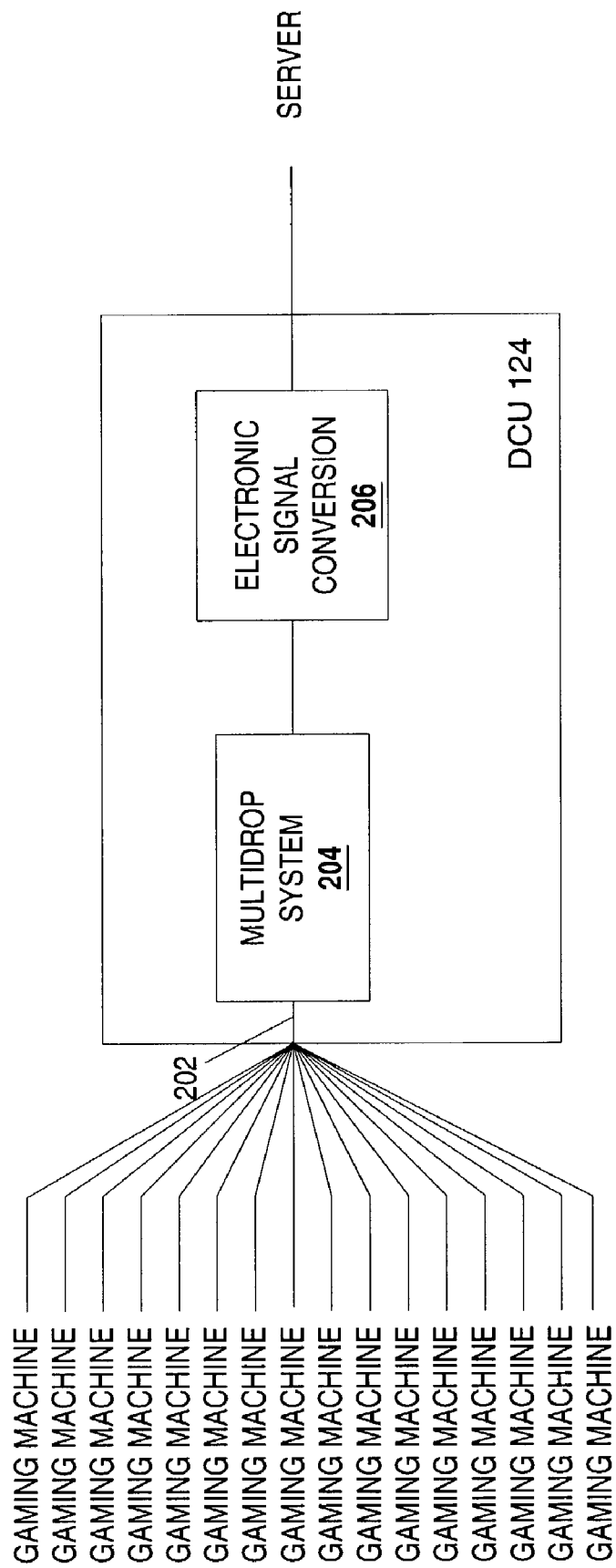
FIG. 2 illustrates a block diagram depicting one example of the DCU of FIG. 1 in the prior art.

One advantage of the enhanced DCU 324 is that the number of communications paths on the gaming communication network are reduced as compared to the prior art described in FIG. 1. For instance, in FIG. 1, gaming machine 102, used three separate communication paths to communicate with the host server 128, the cashless system server 144, and the progressive system server 147. Using the enhanced DCU 324, the gaming machine 302 may communicate with the host server 328, the cashless system server 144 and the progressive server system server using one communication path 322. Thus, the number of communication paths is reduced from 3 to 1.

The enhanced DCU 324 serves as a central node or hub in the gaming communication network by enabling communications between the gaming machine and a plurality of other gaming devices, such as but not limited to the host server 328, the cashless system server 144 and the progressive system server 147. As a hub in the gaming communication network, the enhanced DCU 324 may enable communication between gaming devices executing gaming applications that traditionally do not communicate with another. For example, besides communicating with each of the gaming machines 302, 332, 334 and 336, the host server 328 may communicate with the cashless system server 144, the progressive system server 147 and other gaming devices (not shown) on the gaming communication network via the enhanced DCU 324.

To enable communication between gaming devices, the enhanced DCU 324 may provide protocol mediation service to different gaming devices connected to the gaming communication network that use different communication protocols. For example, gaming machines from different manufactures and similar gaming software applications from different developers may use different communication protocols. For instance, gaming machines by IGT (Reno, Nev.) use a Slot Accounting System (SAS) protocol to talk to accounting applications by IGT. While, gaming machines by Bally's gaming systems (Las Vegas, Nev.) use a Slot Data System (SDS) protocol to talk to accounting applications by Bally's. Using protocol mediation provided by the enhanced DCU 324, IGT gaming machines using SAS may communicate with the Bally's accounting application that uses SDS, IGT gaming machines using SAS may communicate with Bally's gaming machines using SDS, Bally's gaming machines using SDS may communicate with IGT accounting applications using SAS and the IGT accounting applications using SAS may communicate with Bally's accounting applications using SDS.

In the protocol mediation process, the enhanced DCU 324 may receive a message from a first gaming device in a first communication protocol addressed to a second gaming device. The second gaming device may be referred to as the receiver of the message or the message destination. The message may or may not indicate a second communication protocol used by the second gaming device that is needed for the translation. When the message indicates the second communication protocol needed for the translation, the enhanced DCU 324 translates the message to the second communication protocol and forwards the translated message to the second gaming device.

When the message does not indicate the second communication protocol, the enhanced DCU 324 attempts to determine the second communication protocol to use in the translation process. The message from the first gaming device may include additional information about the sender of the message, the receiver of the message, the applications generating and using the information and combinations thereof. This protocol identification information may be used by the enhanced DCU 324 to determine the communication protocol needed for the translation. The protocol identification information may comprise application information and device information. The application information may include but is not limited to a name of the application, a manufacturer of the application and a version number and the device information may include a device type, a manufacture, a version number and communication protocols supported by the device (a gaming device of the present invention may support one or more communication protocols). Using the information in the message, the enhanced DCU 324 may determine the communication protocol needed for the translation, perform the translation and send the message to the second gaming device designated as the receiver of the message.

The enhanced DCU 324 may store information about gaming devices on the gaming communication network that allows it to determine what communication protocol to be used for translation. For instance, the enhanced DCU 324 may store a table listing gaming devices, supported applications and protocols used by each application. Using information it has received from a message sender, information it has received from a message receiver (i.e., intended destination for a message) or combinations thereof, the enhanced DCU 324 may use the stored information to determine the correct protocol to be used in the translation. When the enhanced DCU 324 can't determine what communication protocol is needed, the enhanced DCU 324 may send an error message to the sender of the message or request additional information from the sender of the message, the receiver of the message or combinations thereof.

In one embodiment, the enhanced DCU 324 may contact the second gaming device (i.e., intended destination for the message) via a message that provides information from the message sender that can be used to identify the needed communication protocol such as the application type and the identity of the message sender. The second gaming device may respond with a reply message to the enhanced DCU 324 that indicates the second communication protocol that the enhanced DCU 324 should use to translate the message. When the enhanced DCU 324 receives the reply message from the second gaming device with the necessary protocol information, it translates the message into the format of the specified communication protocol and then the forwards the message to the second gaming device.

With enhanced DCU 324 serving as a communication hub in the gaming network, another function that the enhanced DCU 324 may perform is access control to the gaming network. As part of access control, in some cases, the enhanced DCU 324 may attempt to authenticate one of the identity of the sender of a message, the identity of the receiver of the message or identities of both the sender and the receiver of the message, that pass through the enhanced DCU. For instance, when the enhanced DCU 324 receives a message from a gaming device on the gaming communication network, the enhanced DCU 324 may try to determine if the gaming device is authorized to be on the gaming communication network.

In another embodiment, the enhanced DCU 324 may receive a message from a first gaming device requesting a gaming service from a second gaming device on the gaming communication network. Before forwarding the message to the second gaming device, the enhanced DCU 324 may try to determine if the first gaming device is authorized to receive the requested gaming service. For example, when the first gaming device is a gaming machine that has requested a download of a game from a second gaming device which may be a game server or another gaming machine, the enhanced DCU 324 may check licensing information, stored on the DCU 324 or contact another gaming device storing the licensing information, to determine if the first gaming device has a valid license for the requested game. When the first gaming device has a valid license, the enhanced DCU 324 may forward the request to the second gaming device. When first gaming device does not have a valid license or in general when the first gaming device is not authorized for the requested gaming service, the enhanced DCU 324 may deny the request by not forwarding the message. When the requested service is denied, the enhanced DCU 324 may send an error message to the first gaming device indicating the request has been denied and may also store a log of the transaction.

FIG. 4 illustrates a block diagram depicting the enhanced DCU shown in FIG. 3 according to one embodiment of the present invention. In FIG. 4, the enhanced DCU 324 of the present invention provides at least one network input connection 402 and associated NIC 408. Network input connections and associated NIC performance are well known to those of skill in the art and are not further described herein. In some embodiments, the enhanced DCU 324 may also provide additional network input connections and associated NICs to enable the enhanced DCU 324 to be utilized with a variety of gaming communication networks having different transmission media, such as fiber optic cable, RS232 cable, RS485 cable, ethernet cable, and wireless ports, such as RF and IR ports. For example, in FIG. 4 the enhanced DCU 324 also provides network input connections 404, 406, and 407, with associated NICs 410, 412 and 413. Data transmitted from the gaming communication network 322 passes from the NIC 408 onto the bus structure 422 interconnecting various components of the enhanced DCU 324 and managed by the local CPU 416. Details of NIC's that may be used with the present invention are described in co-pending U.S. application Ser. No. 09/618,365, filed Jul. 18, 2000, by Nguyen, et al., entitled "Configurable Hot-Swap Communication," which is incorporated herein in its entirety and for all purposes.

The enhanced DCU 324 may optionally include a hardware encrypt/decrypt unit 417. The hardware encrypt/decrypt unit may be a specialized logic device, such as crypto chip, used for encryption and decryption of data. An advantage of the logic device is that it may be faster or more secure than some standard software encryption algorithms.

Data destined for the host server 328 may simply be formatted according to a designated file format by the data file conversion module 418 and output over the first and/or second transmission paths 326, 340. The file format conversion may be a part of content transcoding. In content transcoding, the contents of the data sent to a particular device may be optimized through a series of transformation for the capabilities of the device. For instance, a common set of data may be sent to both a cell phone and a gaming machine. The data may be tailored for the capabilities of the gaming machine and thus no transformations may be required. However, for the cell phone, the data may be appropriately scaled to account for the hardware capabilities such as display size, memory and processing power of the cell phone. Further details of transcoding are described with respect to FIG. 6.

As earlier described, the present invention provides redundant network mediation and communication paths between gaming machines on the gaming communication network 322 and the host server 328 utilizing a first transmission path 326 and a second, redundant transmission path 340. It will be appreciated that the first and the second transmission paths 326, 340 may be any of a variety of transmission media, such as wireless, fiber optic cable, and twisted pair cable, and that the present illustration is merely illustrative of the present invention and is not intended to in any way limit the scope of the present invention. In one embodiment, the first transmission path 326 may be a land cable and serve as the primary transmission path to the host server 328, and the second transmission path 340 may be a wireless transmission path, such as an RF or IR transmission path. Thus, the enhanced DCU 324 may also include a transceiver 424 to enable data transmission and reception over the second transmission path 340. In some embodiments, the data may be transmitted over both the first and second transmission paths 326, 340. In other embodiments, the data may be transmitted over the primary transmission path, for example, the first transmission path 326, unless the primary transmission path has been disrupted, and only then transmitted over the redundant transmission path, for example the second transmission path 340, to provide continuing transmission of data to the host server 328.

As earlier described, in the event both transmission paths 326, 340 are disrupted, the enhanced DCU 324 can store the data in a memory structure 414 and/or 415 until such time as a transmission path to the host server 328 is established and the data can be sent. Further, the enhanced DCU 324 can act as an interim server to the gaming machines on the gaming communication network 322 and be programmed to perform some actions typically undertaken by the host server 328. For instance, the enhanced DCU 324 may continue to accumulate player tracking points and metering information when connection to a player tracking server has been lost. As another example, the DCUs may record security events when network connections have failed or a power failure has occurred. In yet another example, the enhanced DCU may accumulate progressive jackpot information in the case when an interruption in a progressive network has occurred. In another embodiment, the enhanced DCU 324 may store transaction information used to authorize cashless transactions.

In gaming communication networks where data are transmitted from the host server 328 to the gaming machines on the network 322, the enhanced DCU 324 may also act as a download server, license server and local cache. The data may be cached in a RAM, DRAM, SDRAM memory 414. Further, the enhanced DCU may include a mass storage device such as a hard drive, DVD drive and CD drive for storing large amounts of cached data. Further, the mass storage device 415 may be used to store data and applications mirrored from other gaming devices.

Some host servers 328 may download gaming machine software updates, or encryption key updates, or other data utilized by the gaming machines on the gaming communication network. Typically, to receive these updates, the gaming machines on the gaming communication network must be taken out of game play mode to accept synchronous transmission of the data.

The enhanced DCU 324 allows the host server 328 to download the data to a memory structure, such as memory 414 and/or 415, where it can be stored and transmitted to the gaming machines of the gaming communication network 322 as they become available. This asynchronous transmission of the data enables game play to continue uninterrupted on a gaming machine, thus mitigating game play disruption and downtime for software and/or data downloads from the server 328.

The enhanced DCU 324 also may act as a local cache for information such as prize descriptions, casino schedules, advertisements, and other information that is repeatedly accessed by the gaming machines on the gaming communication network 322. This information may be stored in the memory structure, 415 or another memory structure specifically designated for cache information.

The enhanced DCU 324 may also act as a license server. As a license server, the DCU 324 may store licensing information that allows games and other gaming software to be downloaded from one gaming device to another gaming device such as from a game server to a gaming machine or between gaming machines. The licensing information may also be used to determine whether gaming software on a particular gaming device may be executed. For example, a number of games may be stored on a gaming machine but the gaming machine may only be able to load or execute games specified in licensing information stored on the DCU 324.

The DCU 324 may track game usage and store game usage information that may be used to bill for gaming software in a pay-per-use model. For instance, the DCU 324 may track information for a number gaming machine regarding what games have been used on the machine over a given time period. This information may be used to calculate a monetary charge based upon the amount of game usage, such as $0.05 cent per use times the number of games that have been played.

In some embodiments, the enhanced DCU 324 may further include a display 428 to provide casino personnel with information regarding the performance of the enhanced DCU 324 and/or a firewall 426 to provide transmission security. Also, as described with respect to FIG. 3, in some embodiments, encryption systems and secure/unsecure key storage memory modules may be included in the enhanced DCU 324.

In other embodiments, as described with respect to FIG. 3, when protocol information is available, the enhanced DCU 324 may also provide protocol translation for messages sent between gaming devices connected to the gaming communication network. In these embodiments, the enhanced DCU 324 may further include a protocol translator 420 that enables the enhanced DCU 324 to format data into a protocol suitable for use with a receiving gaming device connected to the gaming communication network.

As earlier described with regard to FIGS. 3 and 4, the present invention can provide network mediation in which the enhanced DCU 324 acts as an interim server to the gaming machines on the gaming communication network 322 and be programmed to perform some actions typically undertaken by the host server 328. In one embodiment of the present invention, this interim server function may be accomplished by enabling all or selected functions of the host server 328 to be mirrored on the enhanced DCU 324.

Figure 5:
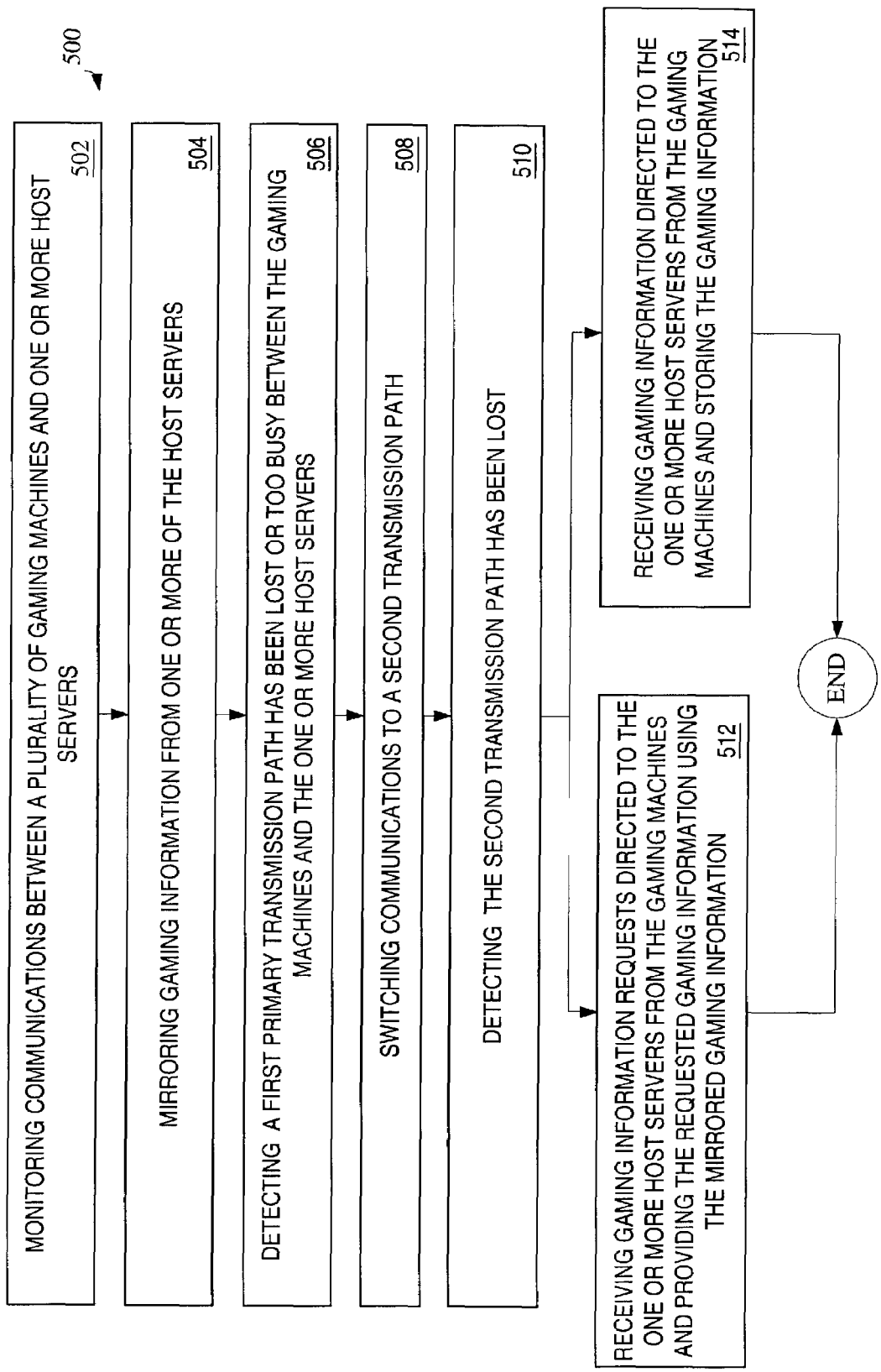
FIG. 5 is a flow chart of a method of providing network meditation using an enhanced DCU.

FIG. 5 is a flow chart of a method of providing network mediation using an enhanced DCU according to one embodiment of the present invention. According to the method 500, at step 502 the enhanced DCU monitors communications between a plurality of gaming machines on the network and one or more host servers. A plurality of enhanced DCUs may perform this task. Therefore, the enhanced DCUs may also communicate with one another in a peer-to-peer network (see FIG. 6).

At step 504, the enhanced DCU mirrors gaming information from one or more of the host servers. This gaming information can be all the gaming information from the host server(s) or selected information. Examples of mirrored information include game licensing information, accumulation of player tracking points, player profile information, cashless transaction authorizations, player preference information, game paytables, game software and frequently requested information (e.g., show times, directions). Mirroring enables the enhanced DCU to locally maintain current specified information held at the host server(s) should the communication to the host server(s) be lost or a transmission path become too busy.

At step 506, the enhanced DCU detects the loss of the first, primary transmission path, and at step 508, the enhanced DCU then switches communications to a second transmission path, which may or may not have been functioning in a redundant capacity.

At step 510 the enhanced DCU detects the loss of the second transmission path. Assuming there are no further transmission paths, this loss signals loss of connection to the host server(s) and initiates the interim server functions of the enhanced DCU.

In some instances, at step 512, the enhanced DCU may receive gaming information requests from the gaming machines directed to the one or more host servers and provide the requested gaming information to the gaming machines using the mirrored gaming information.

In other instances, at step 514, the enhanced DCU may receive gaming information directed to the one or more host servers from the gaming machines and store the gaming information. Once communication with the host server(s) is re-established, the enhanced DCU can then communicate this information to the host server.

As illustrated in the foregoing description and drawings, the present invention provides an enhanced DCU that provides redundant mediation in a gaming communication network. The enhanced DCU includes at least a first transmission path and a second, redundant transmission path. In the event one of the transmission paths is disrupted, the other transmission path provides continuing transmissions between the gaming communication network and the host server. In the event both transmission paths are disrupted, the enhanced DCU functions as a local interim server and stores data from the gaming machines until such time as the data can be transmitted to the host server. The enhanced DCU may also act as a local download server and asynchronously transmit data to the gaming machines on the gaming communication network to minimize game play disruption.

Further, the enhanced DCU may serve as a local cache of information that is regularly accessed by the gaming machines so as to reduce the transmission load on the first and/or second transmission path. In some embodiments, the enhanced DCU provides for more than one type of network connection and, in some instances, can provide protocol translation where protocol information is available.

In one embodiment of the present invention, the enhanced DCU may be located on a gaming machine. Details of providing functions of a DCU on a gaming machine are described in co-pending U.S. application Ser. No. 09/595,798 by Brosnan et al., filed on Jun. 16, 2000 and entitled, "Using a Gaming Machine as a Server," which is incorporated herein in its entirety and for all purposes.

Figure 6:
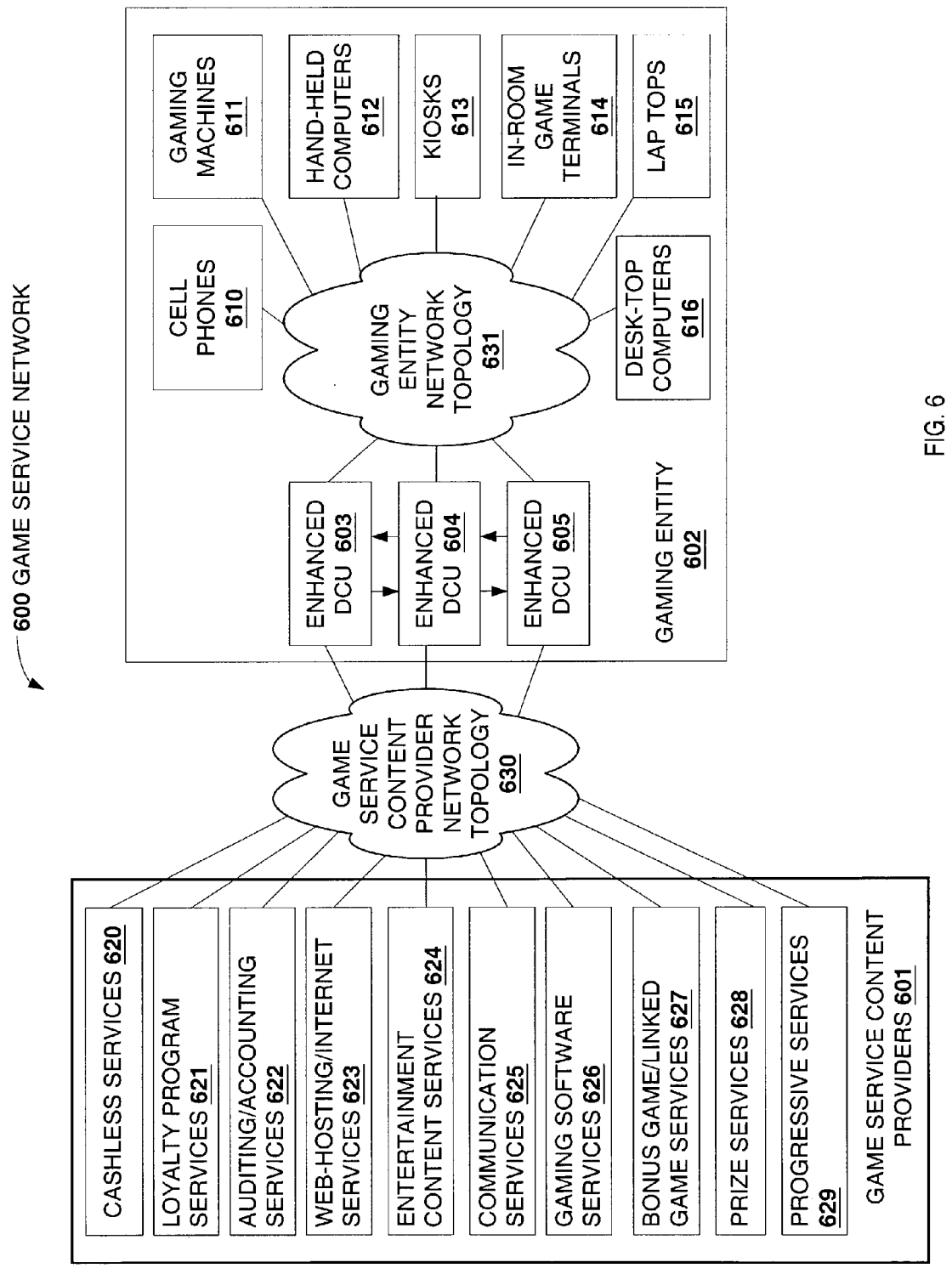
FIG. 6 is a block diagram of gaming service network using enhanced DCUs of the present invention.

FIG. 6 is a block diagram of gaming service network 600 using enhanced DCU's, 603, 604, 605 of the present invention. The gaming entity 602 may comprise a number of gaming locations, such as casinos, hotels, satellite offices and other venues that provide game services, that are connected by a gaming entity network topology 631. The gaming entity network topology 631 may be heterogeneous combinations of different communication architectures using a variety of communication protocols and associated hardware.

The topology 631 may include long distance wireless communication connections using cellular communication standards or local wireless communication connections a wireless standards, such as IrDA, Wi-Fi (802.1x) and Bluetooth.™ The topology 631 may include wired communication connections and standards such as Ethernet communication connections, co-axial cable communication connections, fiber-optic communication connections and regular wired phone connections. Communication standards/protocols and associated their hardware that may be used in the present invention and supported by the enhanced DCU include but are not limited to TCP/IP, USB, Firewire, RS-232, RS-485, IEEE1394, Bluetooth, IEEE 802.11a, IEEE 802.11b, IEEE 802.11x (e.g. other IEEE 802.11 standards), hiperlan/2, and HomeRF.

The gaming entity network topology may link a number of different devices that may be supported within the gaming entity. The devices include but are not limited to cell phones 610, gaming machine 611, hand-held computers (e.g., personal digital assistants), kiosks 613, in-room game terminals 614, lap-tops 615, desk-top computers 616, player tracking units (not shown) and smart cards (not shown). The gaming machines 611 may be used to play games of chance such as but not limited to slot games and card games. The devices may be used by patrons of the gaming entity, such as a patron using a gaming machine to play a game of chance as well as employees of the gaming entity. For example, employees of the gaming entity, such as casino management, may utilize numerous devices such as cell phones, hand-held computers and lap-tops that are connected to the network topology 631.

The devices within the gaming entity 602 may receive gaming information and gaming services from a number of different gaming services content providers 601 including but not limited to cashless services 620, loyalty program services 621, auditing/accounting services 622, web-hosting/internet services 623, entertainment content services 624, communication services 625, gaming software services 626, bonus game/linked game services 627, prize services 628 and progressive game services 629. Cashless services 620 may include services and information related to the validation of cashless instruments, such as printed tickets, and electronic fund transfers that are used within the gaming entity or a combination of gaming entities. Loyalty program services 621 may include services and information related to the accumulation of player tracking points and the validation of player tracking points for services and prizes.

Auditing/accounting services may include services and information relating to tracking the performance of different gaming activities, such as game play on gaming machines, within the gaming entity 602. Web-hosting/Internet services may include services and information provided via the web or the Internet. Entertainment content services 624 may include information and services related to streaming video feeds and audio feeds to a device such as the gaming machine 611. For example, sporting events is an example of video feed that may be provided. Communications services 625 may include information and services related to peer-to-peer communications between various devices in the gaming entity 602 and outside of the gaming entity, such as text messaging, voice communications, video feeds, e-mail, paging and locator services.

Gaming software services 626 may include downloading software to gaming machines 611 and other devices within the gaming communication network. For instance, a game server may provide gaming software and gaming licenses used to play different games of chance on the gaming machines 611. Further, the game server may be used to provide software upgrades and "bug" fixes for the gaming machines 611. In addition, the gaming software service may include the remote configuration of a gaming device such as gaming machines 612 or a casino kiosks 613 with a set of gaming software.

The bonus game/linked game services 627 may include providing linked bonus games and tournament games to the gaming machines 611. The prize services may include providing combinations of cash and non-cash prizes for awards on the gaming machines 611 and methods for redeeming the non-cash prizes. The progressive game services 629 may be related to providing progressive jackpots for games of chance played within the gaming entity. Details of non-cash prize methods and game services that may be used with the present invention are described in co-pending U.S. application Ser. No. 09/515,717, filed on Feb. 29, 200, by Nguyen, and entitled "Name Your Prize Game Playing Methodology," which is incorporated herein in its entirety and for all purposes.

The gaming entity 602 is connected to the game service content providers 601 via the game service content provider network 630. The game service content provider network 630 topology may use combinations of wired and wireless network architectures as described with respect to the gaming entity network topology 631. The game service content providers 601 may be a different entity from the gaming entity 602 or part of the gaming entity 602. For instance, the gaming entity 602 may not generate its own gaming software and the gaming software services 626 may be provided by a number of companies outside of the gaming entity 602 that are in communication with the gaming entity 602. In contrast, the auditing/accounting services 622 may be provided by the gaming entity 602. When game service content is provided by the gaming entity 602, the gaming service content provider, such as auditing accounting service provider 622, may be directly connected to the gaming entity network topology 631.

The game services content providers 601 and the gaming devices within the gaming entity 602 may communicate with one another using services provided by the enhanced DCUs, 603, 604, and 605. The enhanced DCUs may be designed to provided one or more the following services. First, as previously described with respect to FIGS. 3, 4 and 5, the enhanced DCUs may provide a back-up communication path for communications between two gaming devices, two game service content providers or between a game service content provider. The back-up communication path may be provided when a primary communication path is lost or too busy.

The enhanced DCU's may monitor network traffic to perform load balancing. The enhanced DCUs may be connected to one another to perform the load balancing functions as a group by communicating with one another. Further, by connecting the DCUs together, additional communication redundancy may be added.

The enhanced DCUs may perform a number of network mediation tasks. First, the enhanced DCU may convert data signal format to another data signal format such as converting from an RS-232 standard to an RS-485 format or by converting between the RS-485 format to a fiber optic communication format. The data signal conversion may involve changing a physical characteristic of the signal such as a voltage level.

In a second mediation task, the enhanced DCUs may perform protocol conversion. As described above, different manufacturers of gaming devices may utilize different proprietary communication protocols or non-proprietary protocols to communicate gaming information. For instance, a gaming machine manufactured by IGT (Reno, Nev.) may use a Slot Accounting System (SAS protocol). A slot accounting server manufactured by Bally's gaming systems (Alliance gaming corporation, Las Vegas, Nev.) may use a Slot Data System (SDS protocol). Therefore, for communication between a gaming machine using SAS and a server using SDS, the enhanced DCU may translate between SAS and SDS.

In a third meditation task, as described with respect to FIG. 3, the enhanced DCU may provide encryption and decryption services. For instance, the enhanced DCU may store 1) a private encryption key that may be used to decrypt information encrypted with a public key and 2) public keys from a number of other gaming devices. The enhanced DCU may use the keys to encrypt and decrypt data and validate the identity of a data sender. Further, the enhanced DCUs may generate symmetric encryption keys used to encrypt large data files.

The enhanced DCUs may perform a number data caching tasks. For example, files downloaded, such as software or multimedia content, from a game service content provider and sent to a gaming device, such as gaming machine, may cached on the DCU prior to being sent to the gaming device. The data caching may prevent an interruption of game services provided on the target gaming device caused from a large data download. Further, the data caching may be used to reduce network traffic and improve network performance. For instance, to reduce network traffic, frequently requested data may be cached on the enhanced DCUs. A data cache may also provide a data buffer when a connection has been lost or while waiting to make a data uplink connection with another gaming device.

The enhanced DCUs may also be used to perform a number of data transcoding tasks. Transcoding is a process of transforming the format and representation of content. With transcoding, game service content may be filtered, transformed, converted and reformatted to make it universally accessible to a plurality of different gaming devices with different capabilities. In the transcoding process, game service content may be tailored "on the fly" by the enhanced DCU to the capabilities of a target device. An advantage of "just-in-time" transcoding is that it reduces the need to maintain multiple versions of data or applications for multiple device types.

A transcoder service may include a) a basic set of content transformations or transcoders, b) a centralized control of user profiles and preferences for intelligent content modification for targeted devices and a developer tool kit of adding custom transformations. The transcoder service may include content analyzers used to determine the type and purpose of game content. For example, the content analyzer may determine a format for an image and whether it is used for a navigational button or related to textual content. The user profiles may be used to determine how the game service content is transformed for a particular device and/or user. Therefore, not only device capabilities but also user preferences may be considered in the transcoding process. In general, content may be transformed according to authoring intention (e.g., the content itself may specify how it is to be transformed), device constraints, and policies administered by the server/proxy.

Some common transcoding tasks may include but are not limited to 1) performing language translation, such as converting between different mark-up languages, 2) performing text formatting, such as converting tables to bulleted lists, 3) removing features not supported by a target gaming device, such as Java™ script, applets or shockwave files, 4) converting text to a font supported by the device, 5) performing data compression and data scaling to speed transmission, 6) converting between image formats, 7) converting between application formats, 8) speech recognition and 9) text to speech/speech to text conversion. For example, images in a format such as GIF or JPEG may be reduced in scale or color level to speed up transmission and rendering of the images. Further, one image format may be converted to another image format. Communication protocol translations as previously described above may be considered an example of a transcoding service.

Transcoding may be useful because the gaming devices connected to the gaming entity network 631 may share common content sources and perform similar tasks. For example, a game service content provider, such as a game server, may provide a game of chance that is played on the hand-held computer 612, the cell phone 610, the gaming machine 611, the in-room gaming terminal 614 and the desk-top computer 616. To provide the game of chance, the game server may send multimedia content to these devices. The enhanced DCU may analyze 1) the game content provided by the game service content provider, 2) the capabilities of the target device and 3) any restrictions on the game content. After performing the analysis, the enhanced DCU may transform the game data to a format that is optimized for the capabilities of the target device and that satisfies any restrictions that have been imposed, such as restrictions designed to satisfy gaming regulations.

In the present invention, the enhanced DCU's 603, 604 and 605 may be used in a peer-to-peer network where the gaming devices, including but not limited to other DCU's, cell phones 610, gaming machines 611, hand-held computers, kiosks 613, in-room game terminals 614, lap-tops 615 and desk-top controllers 616 and host servers, may share and swap information and applications. To enable peer-to-peer information and application sharing, the enhanced DCU's 603, 604 and 605, may generate and regularly update directories listing information and applications stored on gaming devices connected to the gaming communication network, such as gaming software available for downloading from one gaming device to another. The enhanced DCU's 603, 604 and 605 may also track what devices are currently connected to the gaming communication network. In addition, as described with respect to FIG. 3, the enhanced DCU's may perform access control functions such as but not limited to 1) determining that gaming devices connected to the gaming communication network are authorized to be on the network and 2) determining when transactions between two gaming devices, such as but not limited to requests for applications, information and gaming services, are authorized.

Although the foregoing invention has been described in some detail for purposes of clarity of understanding, it will be apparent that certain changes and modifications may be practiced within the scope of the appended claims. For instance, while the gaming machines of this invention have been depicted as having a top box mounted on top of the main gaming machine cabinet, the use of gaming devices in accordance with this invention is not so limited. For example, a gaming machine may be provided without a top box, or may have additional boxes or devices attached, or may be configured in bar tops, table tops, or other structures. Further, the location of the signature input devices on the gaming machine may vary widely in different embodiments, thus, the examples described herein are not intended to be limiting of the present invention. Additionally, the gaming communication network may be connected to other devices including other servers or gaming devices over the Internet or through other wired and wireless systems.

What is claimed is:

1. A data collection unit that provides redundant gaming communication between gaming machines, gaming devices and host servers on a gaming communication network, the data collection unit comprising:

a first, primary transmission path between the gaming machines on the gaming communication network and a host server; at least a second, redundant transmission path between the gaming machines on the gaming communication network and the host server for transmission of player tracking data and progressive game play data; a logic device designed or configured to i) monitor an availability of each of the first transmission path and the second transmission path, ii) to collect data from at least one of the gaming machine and the gaming devices, iii) to execute a plurality of heterogeneous gaming applications, and iv) to initiate interim server functions if the first transmission path and the second transmission path are unavailable; a transcoding device for transforming a format and a representation of game service content data in real time including a content analyzer to determine a type and a function of the game service content, thereby transforming game service content according to authoring intention, gaming device constraints, and game policies, wherein target device capabilities, game content restrictions, and the game service content are analyzed and wherein gaming regulation restrictions are satisfied; and a protocol mediation component for reconciling two or more communication protocols where data from a first device using a first protocol are translated into a second protocol used by a second device, the translation using a protocol table stored in the enhanced DCU, the table storing gaming devices, supported applications, and protocols used by an application.

2. The apparatus of claim 1, wherein the second, redundant transmission path is a wireless transmission path.

3. The apparatus of claim 1, wherein when one of the first and second transmission paths are lost or busy, the remaining transmission path provides continuing transmissions between the gaming machines of the gaming communication network and the host server.

4. The apparatus of claim 1, wherein when both the first and second transmission paths are lost or busy, the apparatus functions as an interim local server and stores data received from the gaming machines until such time as the stored data are retrieved or can be transmitted to the host server.

5. The apparatus of claim 1, wherein the apparatus functions as a download server and can locally store data received from the host server for transmission to one or more gaming machines on the gaming communication network.

6. The apparatus of claim 5, wherein the apparatus can transmit the data received from the host server asynchronously to one or more gaming machines on the gaming communication network.

7. The apparatus of claim 1, wherein the apparatus functions as a local cache to store data frequently accessed by gaming machines and gaming devices on the gaming communication network, so as to reduce a load on the first and/or second transmission paths.

8. The apparatus of claim 7, wherein the cached data are at least one of casino related information, web page downloads, game license information, player tracking accounting information, cashless system information, progressive game information and bonus prize information.

9. The apparatus of claim 1, wherein the apparatus can accept more than one different format of gaming communication network connection.

10. The apparatus of claim 9, wherein a gaming communication network connection is selected from the group consisting of an RS232 cable connection, an RS485 cable connection, a fiber optic cable connection, ethernet connection and a wireless port connection.

11. The apparatus of claim 1, wherein the apparatus performs data file conversion on the data received from the gaming machines on the gaming communication network prior to forwarding to the host server.

12. The apparatus of claim 1, wherein the apparatus performs protocol translation on the data transmitted between the gaming machines on the gaming communication network and the host server.

13. The apparatus of claim 1, further comprising:
a memory storage device for storing gaming information mirrored on the host server.

14. The apparatus of claim 13, wherein the gaming information is selected from the group consisting of player tracking information, cashless system information and game licensing information.

15. The apparatus of claim 1, further comprising:
gaming software for performing encryption and decryption of messages received by the apparatus.

16. The apparatus of claim 1, further comprising:
a logic device for performing encryption and decryption of messages received by the apparatus.

17. The apparatus of claim 1, further comprising:
gaming software for generating and maintaining directories of information and applications associated with the gaming machines, the gaming devices and the host servers on the gaming communication network that is available for downloading.

18. The apparatus of claim 17, further comprising:
a memory for storing the directories and applications.

19. The apparatus of claim 1, wherein the gaming devices are selected from the group consisting of an enhanced DCU, a cell phone, a hand-held computer, a gaming kiosk, an in-room gaming terminal, a lap-top computer and a desk-top computer.

20. The apparatus of claim 1, further comprising:
gaming software for approving or rejecting requests for i) file swapping and ii) application swapping between two gaming devices on the gaming communication network.

21. The apparatus of claim 1, further comprising:
gaming software for authorizing access to the gaming communication network.

22. The apparatus of claim 1, further comprising:
gaming software for applying a transcoding service to a message received by the apparatus.

23. The apparatus of claim 22, wherein the transcoding service is selected from the group consisting of 1) performing language translation, 2) performing text formatting, 3) removing features of the message not supported by the second gaming device, 4) converting text to a font supported by the second gaming device, 5) performing data compression and data scaling to speed transmission, 6) converting between image formats, 7) converting between application formats, 8) speech recognition, 9) text to speech conversion and 10) speech to text conversion.

24. A gaming communication network, the gaming communication network comprising: two or more enhanced data collection units (DCUs) for providing redundant gaming communication paths for transmission of player tracking data and progressive game play data and for network mediation for communications between gaming machines, gaming devices and one or more host servers over the gaming communication network and for collecting player tracking data and progressive game play data from at least one of the gaming machines and the gaming devices wherein the gaming machines, the gaming devices and the host servers are in communication with the two or more enhanced DCUs wherein the two or more DCUs are connected via a peer-to-peer network thereby further adding to the redundant gaming communications paths and network mediation for communications; and a gaming transmission path network, the gaming transmission path network allowing communication between the host server and the plurality of gaming machines and the gaming devices via the two or more the enhanced DCUs; wherein the two or more enhanced DCUs include a first, primary transmission path between the gaming machines on the gaming communication network and a host server for transmission of the player tracking data and progressive game play data; at least a second, redundant transmission path between the gaming machines on the gaming communication network and the host server capable of transmitting player tracking data and progressive game play data; a logic device designed or configured to i) monitor an availability of each of the first transmission path and the second transmission path, ii) to collect data from at least one of the gaming machine and the gaming devices, and iii) to execute a plurality of heterogeneous gaming applications and iv) to perform one or more of accumulating player tracking data and accumulating progressive game play data; a transcoding device for transforming a format and a representation of game service content in real time including a content analyzer to determine a type and a function of the game service content, thereby transforming game service content according to authoring intention, gaming device constraints, and game policies, wherein target device capabilities, game content restrictions, and the game service content are analyzed and wherein gaming regulation restrictions are satisfied; and a protocol mediation component for reconciling two or more communication protocols where data from a first device using a first protocol are translated into a second protocol used by a second device, the translation using a protocol table stored in the enhanced DCU, the table storing gaming devices, supported applications, and protocols used by an application.

25. The gaming communication network of claim 24, wherein the second, redundant transmission path is a wireless transmission path.

26. The gaming communication network of claim 24, wherein when one of the first and second transmission paths are lost or busy, the remaining transmission path provides continuing transmissions between the gaming machines of the gaming communication network and the host server.

27. The gaming communication network of claim 24, wherein when both the first and second transmission paths are lost or busy, the enhanced DCU functions as an interim local server and stores data received from the gaming machines until such time as the stored data are retrieved or can be transmitted to the host server.

28. The gaming communication network of claim 24, wherein the enhanced DCU functions as a download server and can locally store data received from the host server for transmission to one or more gaming machines on the gaming communication network.

29. The gaming communication network of claim 28, wherein the enhanced DCU can transmit the data received from the host server asynchronously to one or more gaming machines or one or more gaming devices on the gaming communication network.

30. The gaming communication network of claim 24, wherein the enhanced DCU functions as a local cache to store at least one of data and gaming software applications frequently accessed by gaming machines and gaming devices on the gaming communication network, so as to reduce a load on the first and/or second transmission paths.

31. The gaming communication network of claim 30, wherein the cached data are at least one of casino related information, web page downloads, and bonus prize information.

32. The gaming communication network of claim 24, wherein the enhanced DCU can accept more than one different format of gaming communication network connection.

33. The gaming communication network of claim 32, wherein a gaming communication network connection is selected from the group consisting of at least one of an RS232 cable connection, an RS485 cable connection, a fiber optic cable connection, and a wireless port connection.

34. The gaming communication network of claim 25, wherein the enhanced DCU performs data file conversion on the data received from the gaming machines on the gaming communication network prior to forwarding to the host server.

35. The gaming communication network of claim 25, wherein the enhanced DCU performs protocol translation on the data transmitted between the gaming machines, the gaming devices and the host servers on the gaming communication network.

36. The gaming communication network of claim 24, wherein the enhanced DCU further comprises: gaming software for performing encryption and decryption of messages received by the apparatus.

37. The gaming communication network of claim 24, wherein the enhanced DCU further comprises: a logic device for performing encryption and decryption of messages received by the apparatus.

38. The gaming communication network of claim 24, wherein the enhanced DCU further comprises: gaming software for generating and maintaining directories of information and applications associated with the gaming machines, the gaming devices and the host servers on the gaming communication network that is available for downloading.

39. The gaming communication network of claim 38, wherein the enhanced DCU further comprises:
a memory for storing the directories and applications available for downloading.

40. The gaming communication network of claim 24, wherein the gaming devices are selected from the group consisting of an enhanced DCU, a cell phone, a hand-held computer, a gaming kiosk, an in-room gaming terminal, a lap-top computer and a desk-top computer.

41. The gaming communication network of claim 24, wherein the enhanced DCU further comprises: gaming software for approving or rejecting requests for i) file swapping and ii) application swapping between the gaming machine, gaming devices and the host servers on the gaming communication network.

42. The gaming communication network of claim 24, wherein the enhanced DCU further comprises: gaming software for authorizing access to the gaming communication network.

43. The gaming communication network of claim 24, wherein the enhanced DCU further comprises: gaming software for applying a transcoding service to a message received by the enhanced DCU.

44. The gaming communication network of claim 43, wherein the transcoding service is selected from the group consisting of 1) performing language translation, 2) performing text formatting, 3) removing features of the message not supported by the second gaming device, 4) converting text to a font supported by the second gaming device, 5) performing data compression and data scaling to speed transmission, 6) converting between image formats, 7) converting between application formats, 8) speech recognition, 9) text to speech conversion and 10) speech to text conversion.

45. The gaming communication network of claim 24, further comprising a plurality of enhanced DCUs wherein each of the enhanced DCUs is configured to communicate with at least one other enhanced DCU.

46. In an enhanced DCU, a method of providing network mediation on a gaming communication network with a plurality of gaming machines, a plurality of gaming devices, one or more host servers, and a plurality of transmission paths between the gaming machines and the one or more host servers, the method comprising: monitoring an availability of each of a plurality of transmission paths between a plurality of gaming machines, a plurality of gaming devices and one or more host servers; collecting player tracking data and progressive game play data from at least one of the gaming machines, the gaming devices and combinations thereof;

detecting that a first primary transmission path between the gaming machines and the one or more host servers has been lost or has become busy; switching communications to a second redundant transmission path from the plurality of transmission paths; performing one or more of accumulating player tracking data and accumulating progressive game play data if there are no available redundant transmission paths; transcoding a format and a representation of game service content in real time using a content analyzer to determine a type and a function of game service content; transforming the game service content according to authoring intention, gaming device constraints, and game policies; analyzing target device capabilities, game content restrictions, and the game service content; satisfying gaming regulation restrictions; and reconciling two or more communication protocols wherein data from a first device using a first protocol are translated into a second protocol used by a second device, using a protocol table stored in the enhanced DCU.

47. The method of claim 46, further comprising: mirroring gaming information stored on the one or more host servers on the enhanced DCU.

48. The method of claim 46, further comprising:
mirroring gaming information stored on a first host server on the enhanced DCU;
receiving a gaming information request directed to a first host server from a first gaming machine; and
sending a reply message with the requested gaming information to the first gaming machine using mirrored gaming information from the first host server stored on the enhanced DCU.

49. The method of claim 46, further comprising:
detecting the second transmission path has been lost or has become busy.

50. The method of claim 49, further comprising:
receiving a message with gaming information directed to a first host server from a first gaming machine; and
storing the gaming information to a memory device.

51. The method of claim 50, further comprising:
detecting a transmission path between the enhanced DCU and the first host server is available; and
sending the stored gaming information to the transmission server via the first transmission path.

52. The method of claim 46, wherein the one or more host servers is selected from group consisting of a player tracking accounting server, a cashless system server, a game licensing server, a game server, a progressive game server, a bonus game server and a prize server.

53. The method of claim 46, further comprising:
monitoring communication loads on the plurality of transmission paths; and
when the communication load on a first transmission path exceeds a limit, switching a portion of the communication load on the first transmission path to the second transmission path.

54. The method of claim 46, further comprising:
receiving a message from a first gaming machine sent to a first host server in a first communication protocol;
translating the message in first communication protocol to a message in a second communication protocol; and
sending the message in the second communication protocol to the first host server.

55. The method of claim 54, further comprising:
determining the second communication protocol used by the first host server.

56. The method of claim 46, further comprising:
receiving a message from a first host server sent to a first gaming machine in a first communication protocol;
translating the message in the first communication protocol to a message in a second communication protocol; and
sending the message in the second communication protocol to the first gaming machine.

57. The method of claim 56, further comprising:
determining the second communication protocol used by the first gaming machine.

58. The method of claim 46, wherein the plurality of gaming devices is selected from the group consisting of a cell phone, a hand-held computer, a gaming kiosk, an in-room gaming terminal, a lap-top computer and a desk-top computer.

59. The method of claim 46, further comprising:
receiving a message from a first gaming device;
applying a transcoding service to the message; and
sending the transcoded message to a second gaming device.

60. The method of claim 51, wherein the transcoding service is selected from the group consisting of 1) performing language translation, 2) performing text formatting, 3) removing features of the message not supported by the second gaming device, 4) converting text to a font supported by the second gaming device, 5) performing data compression and data scaling to speed transmission, 6) converting between image formats, 7) converting between application formats, 8) speech recognition, 9) text to speech conversion and 10) speech to text conversion.

61. The method of claim 59, further comprising:
determining content types of the message that is to be displayed on the second gaming device.

62. The method of claim 59, further comprising:
determining content displaying capabilities of the second gaming device.

63. The method of claim 59, wherein the first gaming device is selected from the group consisting of an enhanced DCU, a host server, a gaming machine, a cell phone, a hand-held computer, a gaming kiosk, an in-room gaming terminal, a lap-top computer and a desk-top computer.

64. The method of claim 59, wherein the second gaming device is selected from the group consisting of an enhanced DCU, a host server, a gaming machine, a cell phone, a hand-held computer, a gaming kiosk, an in-room gaming terminal, a lap-top computer and a desk-top computer.

65. The method of claim 46, further comprising:
encrypting a communication between the gaming machines, the gaming devices and the one or more host servers.

66. The method of claim 46, further comprising:
decrypting a communication between the gaming machine, the gaming devices and the one or more host servers.

67. The method of claim 46, further comprising:
for devices in communication with the enhanced DCU, controlling access to the gaming communication network by the devices.

68. The method of claim 46, further comprising:
generating a directory of at least one of data and applications stored on the enhanced DCU, the gaming machines, the gaming devices and at least one host server that is available for the download on the gaming communications network.

69. The method of claim 68, wherein the download is between a first gaming device and a second gaming device and wherein the first gaming device and the second gaming device are selected from the group consisting of the gaming machines, the gaming devices, the one host server and the enhanced DCU.

70. The method of claim 46, further comprising:
communicating with a second enhanced DCU.

* * * * *